United States Patent
Radia et al.

(10) Patent No.: US 6,260,074 B1
(45) Date of Patent: *Jul. 10, 2001

(54) METHOD AND APPARATUS FOR PASSING GENERIC OBJECTS IN A DISTRIBUTED SYSTEM

(75) Inventors: Sanjay R. Radia, Fremont; Peter Kessler, Palo Alto, both of CA (US)

(73) Assignee: Sun Microsystems, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/618,878

(22) Filed: Mar. 30, 1996

(51) Int. Cl.[7] .................. G06F 9/00; G06F 9/46; G06F 15/163
(52) U.S. Cl. .................................................. 709/304
(58) Field of Search .................. 395/683, 684, 395/680, 200.09, 200.2

(56) References Cited

U.S. PATENT DOCUMENTS

| | | | |
|---|---|---|---|
| 5,307,490 | * 4/1994 | Davidson et al. | 395/684 |
| 5,511,197 | * 4/1996 | Hill et al. | 395/684 |
| 5,526,491 | * 6/1996 | Wei | 395/200.09 |
| 5,566,302 | * 10/1996 | Khalidi et al. | 395/684 |
| 5,577,251 | * 11/1996 | Hamilton et al. | 395/200.09 |
| 5,596,579 | * 1/1997 | Yasrebi | 395/200.2 |

OTHER PUBLICATIONS

The Common Object Request Broker Architecture and Specification Revision 2.0, OMG, p. 329–331 & 361–363, Jul. 1995.*

Michael D. Schroeder, Michael Burrows, Performance of Firefly RPC, SRC Report 43 p. 1–15, Apr. 15, 1989.*

Sarjay Radia, Peter Madany, Michael L. Powell, Persistance in the Spring System, Sun Microsystems, p. 1–10, Dec. 1993.*

* cited by examiner

Primary Examiner—Alvin E. Oberley
Assistant Examiner—Peter Stecher
(74) Attorney, Agent, or Firm—Blakely Sokoloff Taylor & Zafman

(57) ABSTRACT

A method and apparatus for passing generic objects in a distributed system is disclosed. At the receiving process, the generic object is unmarshaled. However, the object of type T is maintained in its marshaled form. If the generic object is subsequently passed to another process, a copy of the marshaled form of the object of type T is passed. The object of type T is not unmarshaled until the generic object is received by a process that narrows the generic object into the object of type T.

21 Claims, 11 Drawing Sheets

METHOD AND APPARATUS FOR PASSING GENERIC OBJECTS IN A DISTRIBUTED SYSTEM

BACKGROUND OF THE INVENTION

FIELD OF THE INVENTION

The present invention relates to the fields of distributed computing systems, client-server computing and object oriented programming. Specifically, the present invention is a method and apparatus for providing program mechanisms which allow a generic or intermediate service to receive, hold and pass along a generic object without having the marshal and unmarshal code for the object of a specific type.

BACKGROUND

Typically, in object oriented systems, multiple processes are executing in multiple address spaces, and the processes are invoking the methods on objects in the same address space or in a different address space. With respect to local objects (i.e., serverless objects), invoking methods on these local objects are relatively straightforward since the implementation code associated with the methods reside in the same address space. When invoking methods of objects that are remote (i.e., across address spaces that may cross machine boundaries), a remote procedure call is typically employed to invoke the methods of remote objects.

When invoking the methods of objects across address spaces, arguments or parameters are typically passed or communicated. For example, simple variables such as int, char, string, and complex variables, such as arrays and records, may be passed between address spaces. In object oriented systems, objects such as serverless objects or remote (server-based) objects may also be passed from one address space to another.

FIG. 1 illustrates a serverless or local object 2. The serverless object 2 is located in a single address space and includes methods 4 and corresponding implementation code 6 for the methods. The serverless object 2 also includes state or data 7. When a serverless object 2 is passed as an argument across address spaces, its entire state or data 7 is passed (i.e., the entire state or data 7 is marshaled and unmarshaled).

Marshaling is simply an operation that is used when transmitting an object between address spaces. Marshaling takes the current object and places enough information (i.e., the marshaled form of the object) in a communications buffer so that an essentially identical object can be unmarshaled from this buffer in another address space. Unmarshaling is simply an operation that is used when receiving an object from another address space. Unmarshaling creates or fabricates an object in the new address space by using the marshaled form (e.g., a string of bits) of the transmitted object.

An intermediate service or generic service that receives, holds and passes along a serverless object is required to have the marshal and unmarshal code for the type of the serverless object.

FIG. 2 illustrates a remote (server-based) object 8. This remote object 8 includes methods 10 that interface with stubs 12. The remote object 8 includes the client side representation 14 of the state. This client side representation 14 is typically a remote pointer to the implementation code 20 (e.g., network pointers to the actual location of the code). The client side representation 14 of the state points to the state or data 18 that is disposed in a server 16, which is remote from the client where the server-based object 8 resides. Stubs 12 are code that request execution of corresponding implementation code on server 16 associated with the particular method 10 of interest.

When a remote object is passed as an argument, its client side representation of state 14 is passed (i.e., the client side representation is marshaled and unmarshaled). In some object oriented systems, the representation for a remote (server-based) object is fixed. In these systems, the marshal and unmarshal code of these remote objects are distributed to the services in a network. In more flexible object oriented systems, the client side representation of a remote object is variable and not static. In these systems, code (subcontract) is necessary to handle the different object representations. For further information on subcontracts see "Subcontract: A Flexible Base for Distributed Programming" from "A Spring Collection, A Collection of Papers on the Spring Distributed Object-Oriented Operating System", September 1994. Accordingly, for remote objects having variable representations, an intermediate or generic service needs the code for a subcontract that handles the particular type of the remote object.

OBJECTS OF GENERIC TYPES

Many systems have generic types. Examples are type "Any" and type "Object" in CORBA compliant systems. For further information on CORBA, see the "Common Object Request Broker: Architecture and Specification", Revision 2.0, July 1995. Another example is the type "named" in the Spring Operating System developed by Sun Microsystems. For further information on Spring, see "A Spring Collection, A Collection of Papers on the Spring Distributed Object-Oriented Operating System", September 1994. Variables of specific types can be converted to variables of one of these generic types. The term, "Variables", as used herein includes objects. Objects are special kinds of variables that are defined by specifying an interface and allow subclassing by inheritance. For example, in CORBA a variable (e.g., an object) of any type can be converted to a variable of type "Any". In CORBA compliant systems and systems using the Java language an object of any type can be converted to a variable of type "Object". In Spring any variable (e.g., object) can be converted to a variable of type "Named."

FIG. 3 illustrates the mechanism of marshaling and unmarshaling when passing an object of a specific type (T) 22 from a first address space 24 to a second address space 26 (e.g., across machines in a network). The object 22 of a specific type T is passed from a first address space 24 to a second address space 26 in accordance with the following steps. First, a marshal procedure marshals the state or data 23 of the object 22 to generate a marshaled form of the state of object. The marshaled form of the state of the object is placed into a marshal buffer 30. A copy of the marshal buffer 30 is transmitted from the first address space 24 to the second address space 26. A marshal buffer 32 corresponding to the second address space 26 receives the marshaled form of object of Type T. An unmarshal procedure unmarshals the marshaled form of the state of the object and creates the object 34 in its unmarshaled state. As noted previously, the passing of an object of a specific type occurs as part of invoking a method of an object where an object of a specific type T is passed as an argument.

When an object of a specific type T is passed between address spaces, the object is marshaled on the transmit side and unmarshaled on the receiving side. The marshaled form of the object of type T is usually specific to type T. A sender needs to have marshal code to perform the marshaling of the object of type T. A receiver needs to have unmarshal code to perform the unmarshaling of the object of type T. An intermediate service (generic service) needs to have both the marshal code and the unmarshal code to perform the marshaling and unmarshaling of the object of type T since a generic service receives a generic object, holds it, and communicates it to another address space.

FIG. 4 illustrates a prior art technique of passing generic objects from a first address space 40 to a second address space 41 and then to a third address space 42. Again, the passing of generic objects arises as part of invocation of a method, when a generic object is passed as an argument in the method. First, an object 44 of type T (where T may be any type) is converted or widened 38 into a generic object 45. Next, a marshal procedure marshals 39 the generic object 45 (i.e., marshals the type identification and state of the generic object). Marshaling the state/data of the generic object entails marshaling the object of type T 43. This marshal procedure generates a marshaled form of the generic object. The marshaled form of the generic object is stored in the marshal buffer 46 of address space 40. The marshaled form is transmitted 47 to the second address space 41 and received by a receiving marshal buffer 48.

Then, an unmarshal 49 procedure unmarshals the marshaled generic object to recover the generic object 50. Then, an unmarshal 49 procedure unmarshals the marshaled form of object T to recover object T in its true form. It should be noted that generic object 50 includes the object of type T 51 in its true form or unmarshaled form. Next, the generic object 50 is marshaled 53 and placed into the transmit marshal buffer 52. The marshaled form of the generic object 50 is then transmitted 57 to the third address space 42 and received by marshal buffer 54. The marshaled form of the generic object 50 is then unmarshaled 58 to generate generic object 55 that includes the true form of the object of type T 60. Subsequently, generic object 55 is narrowed 59 into the object of type T 56.

The above-noted prior art approach has the following disadvantages. First, in order to pass a generic object of a serverless object having a specific type, each generic service, and any service for that matter, is required to have the marshal and unmarshal code for any possible object types that it may receive. For example, a generic service that receives serverless objects is required to have marshal and unmarshal codes for objects of any type since any type of object may be encapsulated in a generic object. Second, it is extremely inefficient for all intermediate services to have this code in that it occupies storage space. Third, and more importantly, it is not practical to distribute the marshal and unmarshal code for all object types since there are new types of objects created after the system is deployed. Fourth, this approach raises security issues. For example, if one could load any marshal and unmarshal code onto a service, the code itself could contain security holes (e.g., a virus). Accordingly, a system implementing this prior art approach must either check the marshal and unmarshal code for security holes and/or verify that the code is from a reputable source.

Accordingly, a method and apparatus for passing generic objects in distributed systems that overcome the limitations noted above is desired.

BRIEF SUMMARY OF THE INVENTION

The present invention provides a method and apparatus for a generic service to unmarshal a generic variable, hold it, and remarshal it to another client without loading the unmarshal and marshal code of the specific variable type. Moreover, these mechanisms function in a distributed computer environment with similar ease and efficiency, where client applications may be on one computer node and object implementations on another.

In one aspect of the invention, a computer performed method is disclosed of passing generic objects from one address space to another address space without unmarshaling the marshaled form of the object of type T.

In another aspect, the present invention, as implemented in a generic service, maintains the generic object in its marshaled form. The marshaled form is simply copied and kept. Later the object is passed out again, the marshaled form can be copied back to the marshal buffer. The final receiver of the object unmarshals the generic object and generates a generic object which includes a marshaled form of the object of type T. Later when the final receiver of the object tries to use the object (i.e., perform operations on the object), the generic object is unmarshaled using the unmarshal code of the true type. Since the object is going to be used the address space does have all the code for using the object including the marshal and unmarshal code.

In another aspect, the present invention provides that use of the unmarshaling code is delayed until the object is actually used and at that time the code is available anyway.

Similarly, the claimed invention includes a computer program product embodying these inventive mechanisms.

BRIEF DESCRIPTION OF THE DRAWINGS

The objects, features and advantages of the system of the present invention will be apparent from the following description in which.

DETAILED DESCRIPTION OF THE INVENTION

Notations and Nomenclature

Figure 1:
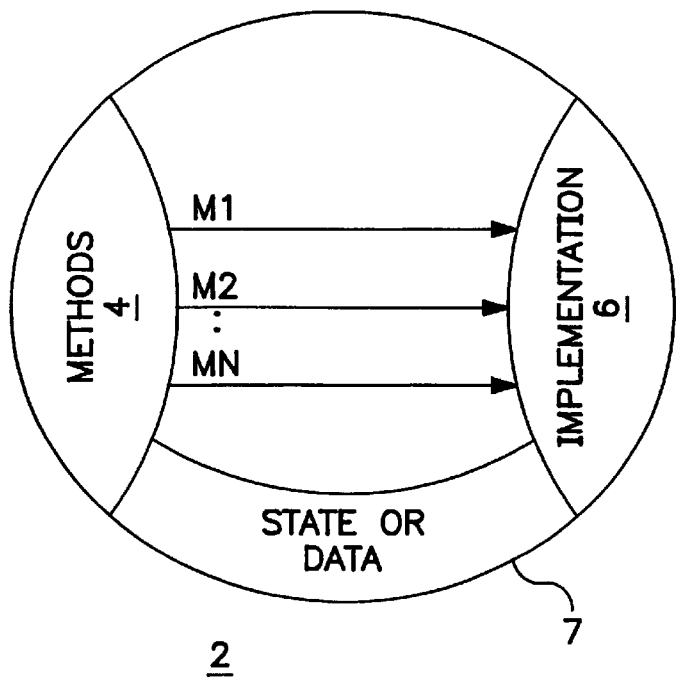
FIG. 1 illustrates a serverless object.
Figure 2:
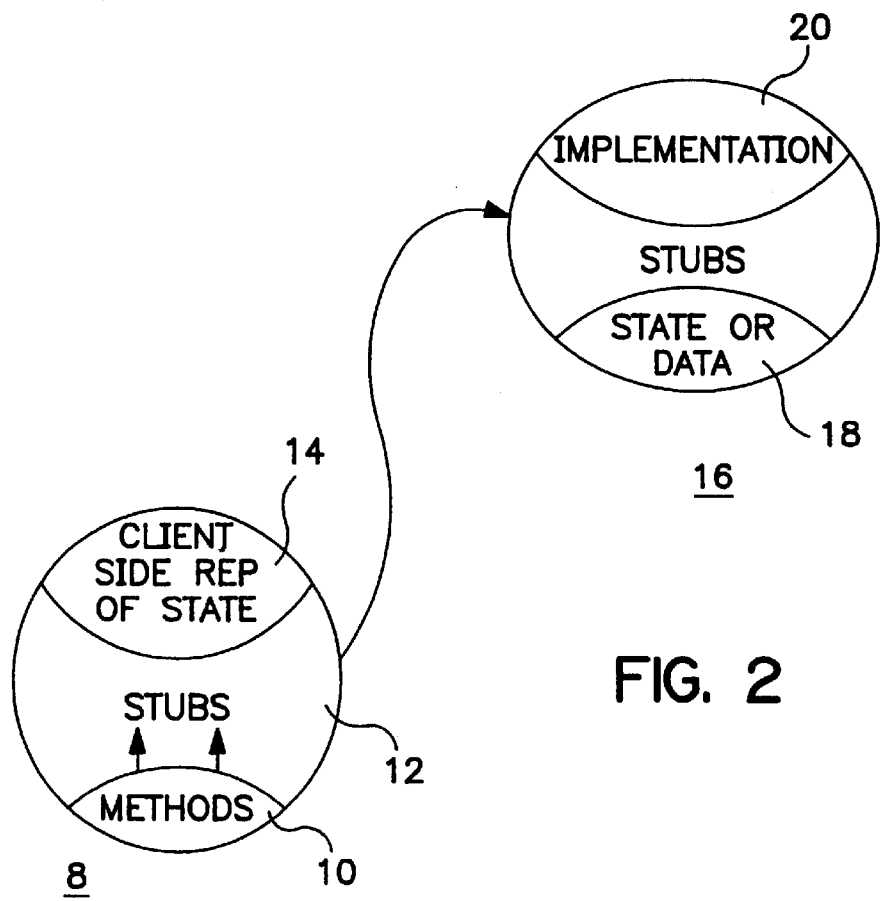
FIG. 2 illustrates a server-based object.
Figure 3:
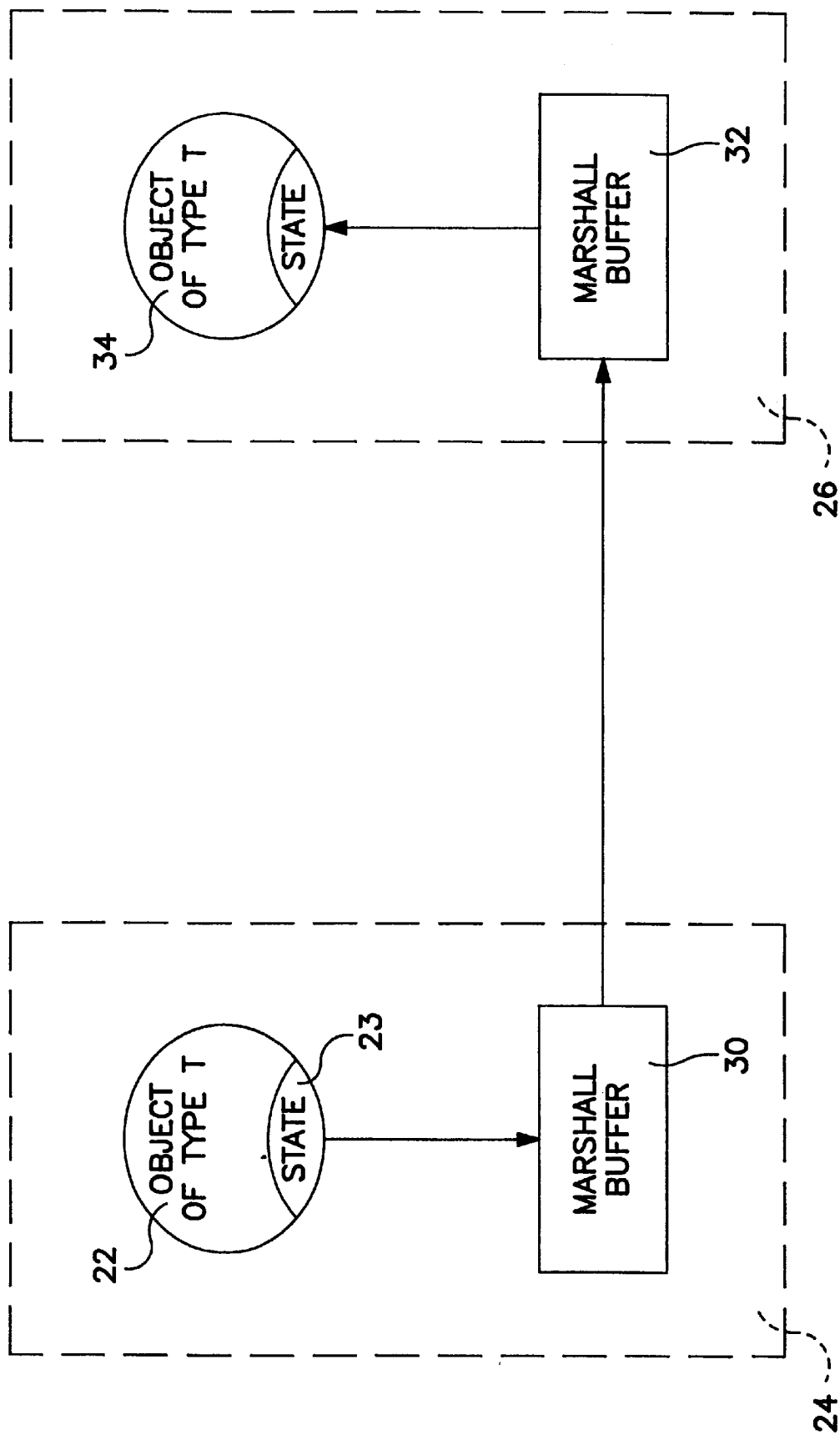
FIG. 3 illustrates marshaling and unmarshaling that occurs when passing an object of a specific type from a first address space to a second address space.
Figure 4:
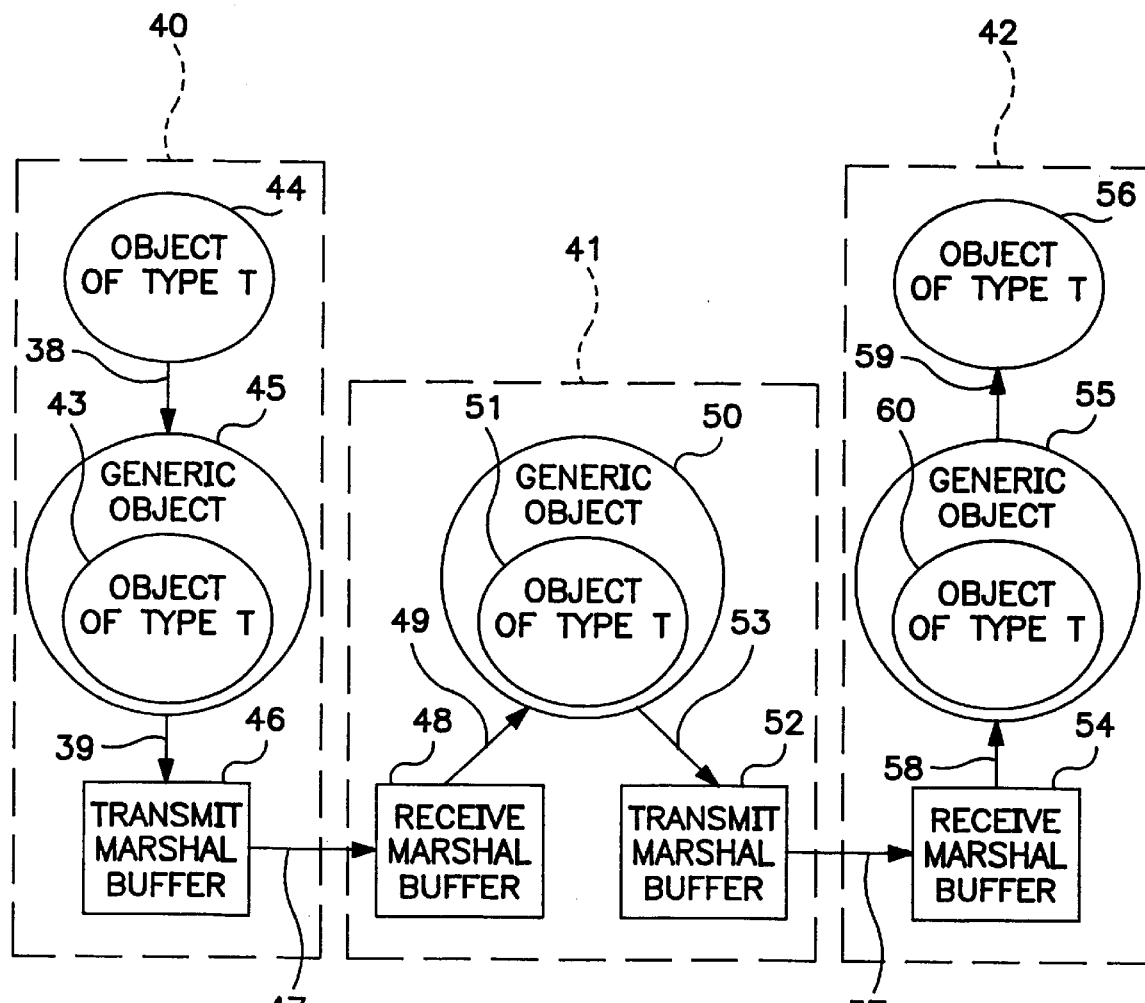
FIG. 4 illustrates the prior art technique for passing a generic object from a first address space to a second address space.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

In the following descriptions for purposes of explanation, specific data and configurations are set forth in order to provide a thorough understanding of the present invention. The preferred embodiment described herein is implemented as a portion of the SPRING-DISTRIBUTION—Object-Oriented Operating System created by Sun Microsystems, Inc. (Sun Microsystems is a registered trademark of Sun Microsystems, Inc.). However, it will be apparent to one skilled in the art that the present invention may be practiced without the specific details and may be implemented in various Computer systems and in various configurations or makes or models of tightly-coupled processors or in various configurations of loosely-coupled multiprocessor systems. The Spring-Distribution Object-Oriented Operating, System is described in "A Spring Collection", A Collection of Papers on the Spring distributed Object-Oriented Operating System published September 1994 by Sun Microsystems, Inc.

Operating Environment

Figure 5:
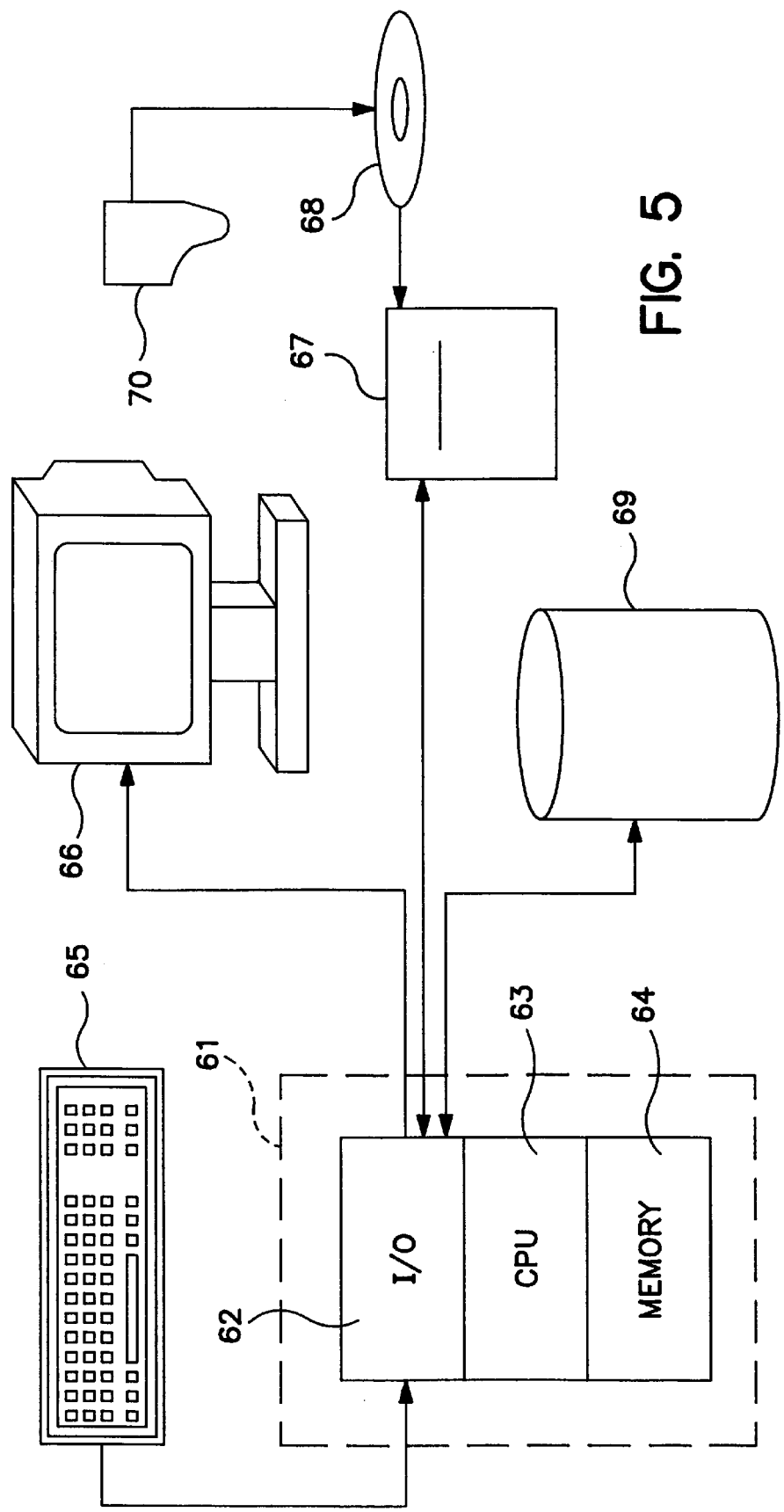
FIG. 5 illustrates the configuration of a typical computer hardware system used with and as part of the present invention.

The environment in which the present invention is used encompasses the general distributed computing system, wherein general purpose computers, workstations, or personal computers are connected via communication links of various types, in a client-server arrangement, wherein programs and data, many in the form of objects, are made available by various members of the system for execution and access by other members of the system. Some of the elements of a general purpose workstation computer are shown in FIG. 5, wherein a processor 61 is shown, having an Input/output ("I/O") section 62, a central processing unit ("CPU") 63 and a memory section 64. The I/O section 62 is connected to a keyboard 65, a display unit 66, a disk storage unit 69 and a CD-ROM drive unit 67. The CD-ROM unit 67 can read a CD-ROM medium 68 which typically contains program code mechanisms 70 and data.

Stubs

Figure 6:
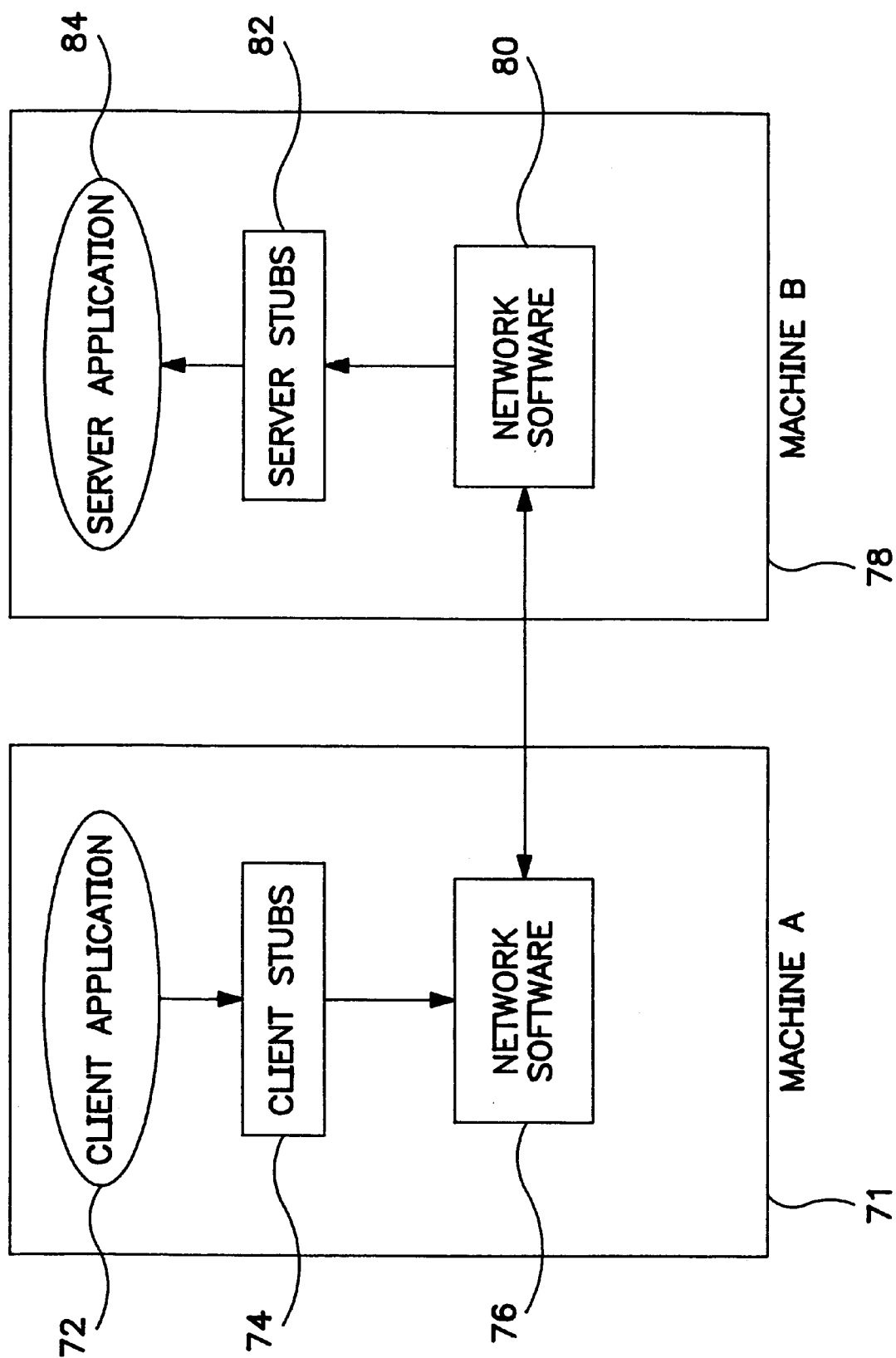
FIG. 6 illustrates the relationship of client and server applications to stubs and network software.

Techniques for providing a language-level veneer for remote operations (for example, "Remote Procedure Calls") have been in use for many years, "Remote Procedure Call" Bruce Nelson, Xerox, CSL-81-9. Typically these take the form that a remote interface is defined in some language. Then a pair of stubs are generated from this interface. The client stub runs in one machine and presents a language level interface that is derived from the remote interface. The server stub runs in some other machine and invokes a language-level interface that is derived from the remote interface. Referring now to FIG. 6, to perform a remote operation, a client application 72 on one machine 71, invokes the client stub 74, which marshals the arguments associated with the invocation into network buffer(s) and transmits them to the server stub 82 on the remote machine 78, which unmarshals the arguments from the network buffer(s) and calls the server application 84. Similarly, when the server application 84 returns a response, the results are marshaled up by the server stub 82 and returned to the client stub 74, which unmarshals the results and returns them to the client application 72. The entire mechanics of argument and result transmission, and of remote object invocation, are performed in the stubs. Both the client application and the server application merely deal in terms of conventional language-level interfaces.

When the arguments or results are simple values such as integers or strings, the business of marshaling and unmarshaling is reasonably straightforward. The stubs will normally simply put the literal value of the argument into the network buffer. However, in languages that support either abstract data types or objects, marshaling becomes significantly more complex. One solution is for stubs to marshal the internal data structures of the object and then to unmarshal this data back into a new object. This has several serious deficiencies. First, it is a violation of the "abstraction" principle of object-oriented programming, since stubs have no business knowing about the internals of objects. Second, it requires that the server and the client implementations of the object use the same internal layout for their data structures. Third, it may involve marshaling large amounts of unnecessary data since not all of the internal state of the object may really need to be transmitted to the other machine.

An alternative solution is that when an object is marshaled, none of its internal state is transmitted. Instead an identifying token is generated for the object and this token is transmitted. For example in the Eden system, objects are assigned names and when an object is marshaled then its name rather than its actual representation is marshaled. Subsequently when remote machines wish to operate on this object, they must use the name to locate the original site of the object and transmit their invocations to that site. This mechanism is appropriate for heavyweight-objects, such as files or databases, but it is often inappropriate for lightweight abstractions, such as an object representing a Cartesian coordinate pair, where it would have been better to marshal the real state of the object. Finally, some object-oriented programming systems provide the means for an object implementation to control how its arguments are marshaled and unmarshaled. For example, in the Argus system object implementors can provide functions to map between their internal representation and a specific, concrete, external representation. The Argus stubs will invoke the appropriate mapping functions when marshaling and unmarshaling objects so that it is the external representation rather than any particular internal representation that is transmitted. These different solutions all either impose a single standard marshaling policy for all objects, or require that individual object implementors take responsibility for the details of marshaling. An advanced object marshaling process is described in the above referenced pending patent application Ser. No. 07/995,863 filed Dec. 21, 1992, now abandoned which describes "Subcontracts."

As noted previously an object oriented programming systems, arguments (e.g., parameters) are passed from one process to another by marshaling and unmarshaling. For example, in a method invocation (e.g., O1->M1 (A1, A2)), the following steps are typically performed by a marshal procedure (also known as a stub). First of all, the stub marshals the identity of the object (O1). Next, the stub marshals the method (M1), associated with the object (O1). Next, the stub marshals the first argument (A1). Last, the stub marshals the second argument (A2).

The receiver side (i.e., the process receiving this information) performs all of the above-noted steps in reverse (i.e., the identity of the object, method and the arguments are unmarshaled).

The present invention concerns the case where one of the arguments encountered during method invocation is a generic object. Specifically, the present invention provides a method and apparatus for passing a generic object from a first address space to a second address space without unmarshaling the object of type T until the generic object is narrowed by a process that invokes a method of the generic object.

Figure 7:
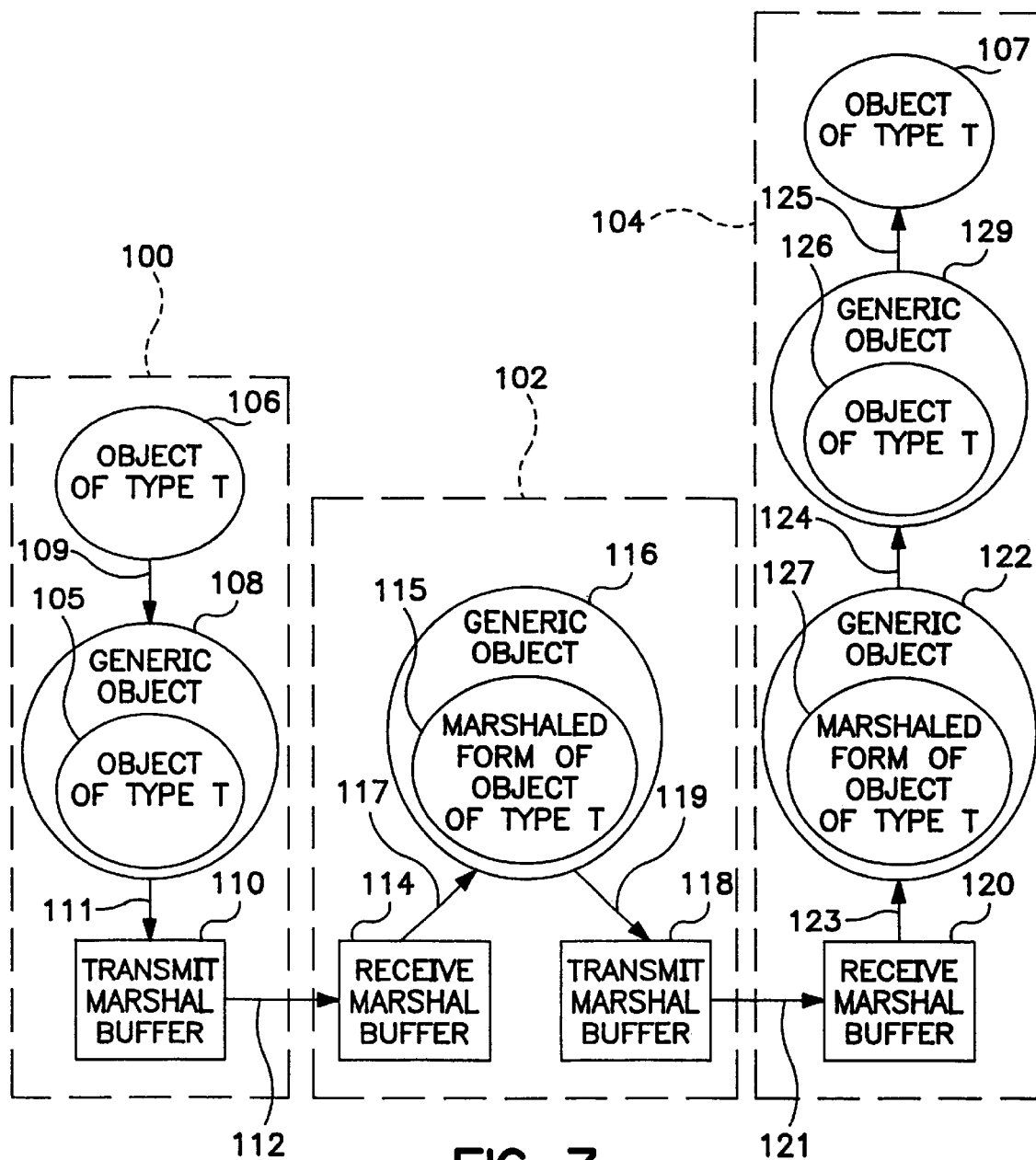
FIG. 7 illustrates how a generic object is passed from one address space to another using the teachings of the present invention.

FIG. 7 illustrates how a generic object is passed from a first address space (e.g., client) 100 to a second address space (e.g., a generic service) 102, and subsequently passed to a third address space 104 using the teachings of the present invention. Initially, there is an object 106 of type T (where T is any type). The object 106 of type T is represented as a circle denoted by the letter T. The object 106 of type T is converted into a generic object 108 via a widening operation 109, which is well known in the art. When the object 106 of type T is widened to a generic object 108, the generic object 108 is said to encapsulate the object of type T 105.

When the generic object 108 is encountered during the invocation of a method, and the generic object 108 is to be passed to another address space, the present invention implements the following steps.

First, generic object 108 is marshaled 111 and a marshaled form of the generic object is placed into a marshal buffer 110. Typically, the step of marshaling a generic object 108 involves marshaling the generic object's type identifier (e.g., class of generic object). Subsequently, the state or data of the generic object 108 is marshaled. Since the state of the generic object 108 is the object 106 of type T, the object 106 of type T is marshaled. Marshaling an object 106 of type T involves marshaling the object's state (e.g., the object 's data). If the object of type T is a serverless object, all of the object's state or data is marshaled. If the object of type T is a server-based object (i.e., a remote object), the object's client side representation of the data is marshaled. An object's client side representation of the data typically includes the identification of the remote server and identification of the object within the remote server.

The concept of marshaling data is known in the art and is simply taking a memory representation of the data and linearlizing it into a buffer.

As will be described, in one embodiment of the present invention, the present invention modifies the stub for marshaling the generic object to include the specific steps of marshaling a length indicator which is indicative of the length of the marshaled form of object of type T.

Referring again to FIG. 7, the present invention transmits 112 (i.e., copies and/or transforms) the marshaled form of the generic object, stored in marshal buffer 110 to the second address space 102. For example, the marshaled form of the generic object may be copied into a receiving marshal buffer 114.

A stub unmarshals 117 the marshaled form of the generic object and generates a generic object 116 having a marshaled form 115 of the object T. For example, the generic object may simply copy the marshaled form of object of type T from the receiving marshal buffer 114.

When another service in a third address space 104 requests the generic object 116, the generic object, having the marshaled form of the object of type T 115 is marshaled 119 and copied into the transmission marshal buffer 118. The generic object is marshaled (i.e., the type identifier and length indicator of the marshaled form of the object of type T are marshaled). The marshaled generic object is transmitted 121 or copied to a marshal buffer 120 in a third address space 104. The generic object is unmarshaled 123 to generate the generic object 122 having a marshaled form of the object of type T.

When the generic object 122 having a marshaled form of the object of type T 127 is narrowed to generate the object of type T 107, it is implicitly unmarshaled. This implicit unmarshaling is denoted by path 124 and generic object 129 having encapsulated the object of type T 126 in its true form.

The object of type T remains in its marshaled form 127 until the generic object is narrowed into the object of type T. For example, the object of type T may be implicitly unmarshaled 124 when the generic object is converted or narrowed 125 into object T 107.

As will be described in greater detail hereinafter, the present invention allows the generic or intermediate service 102 to simply pass the marshaled form 115 of the object of type T to a subsequent service that requests the generic object. An intermediate service (also referred to as a generic service) is simply a service that does not operate on an object's data (i.e., a intermediate service does not invoke the methods of an object). Accordingly, an intermediate service does not require the code of the object (e.g., marshal and unmarshal code)

The marshaled form 115 of the object of type T is unmarshaled at the service where the methods of the generic object are invoked. For example, when the generic object 122 is narrowed into the object of type T 107, since all the code implementing the methods of the object are available, the marshaled form of T may be unmarshaled during the narrow operation.

In one embodiment, a stub marshals a generic object by performing the following. First, the stub marshals the type identifier of the generic object. Next, the stub marshals the state or data of the generic object, which is the object of type T, encapsulated by the generic object. In an alternative embodiment, a length indicator of the marshaled form of the object of type T or a pointer to the length indicator is marshaled during the marshaling of the generic object.

When a receiving service unmarshals the marshaled generic object stored in the marshal buffer, the stub performs the following. First, the object identification, method identification and all other arguments are unmarshaled. Next, with respect to the generic object, the marshaled form of the type identification is unmarshaled and stored in the generic object. Also, a copy of the marshaled form of object of type T is copied to a temporary buffer. Alternatively, the pointer to the storage location of the marshaled form of the object of type T may be stored inside the generic object.

If the length of the marshaled form of the object of type T is marshaled in the previous service, the length is unmarshaled by the receiving service. This length is used in the copy operation to copy the marshaled form of the object of type T from the receiving marshal buffer to the temporary buffer or is used in conjunction with a stored pointer to the stored location of the marshaled form of the object of type T.

When the generic object is passed or returned to another service, the intermediate service marshals the generic object by performing the following steps. The type identification of the generic object is marshaled. Also, the marshaled form of the object of type T is marshaled. As noted previously, marshaling is simply copying and/or transforming data from one buffer to another buffer. It should be noted that the marshaling performed by the different services are not necessarily identical. In fact, the marshaling code is often different in that the arguments of the particular method invoking a generic object may be different and/or have different positions in the procedure code. Also, the marshaled form in the transmission marshal buffer is not necessarily identical and is most likely different from the receiving marshal buffer.

It should be noted that although in one embodiment, the marshaled form of the generic object is stored in a marshal buffer (e.g., a software buffer allocated upon invocation of a method), in an alternative embodiment, the marshaled form of the generic object (or a pointer to the object) may be passed directly to another process.

The marshal buffer is typically copied or transmitted across a network from one machine to another. Similarly, in a single machine, a copy of the marshal buffer may be moved across address spaces. The original marshal buffer is retained so that the same marshal buffer may be reused at a subsequent time (e.g., when a return of a procedure call occurs).

Figure 8:
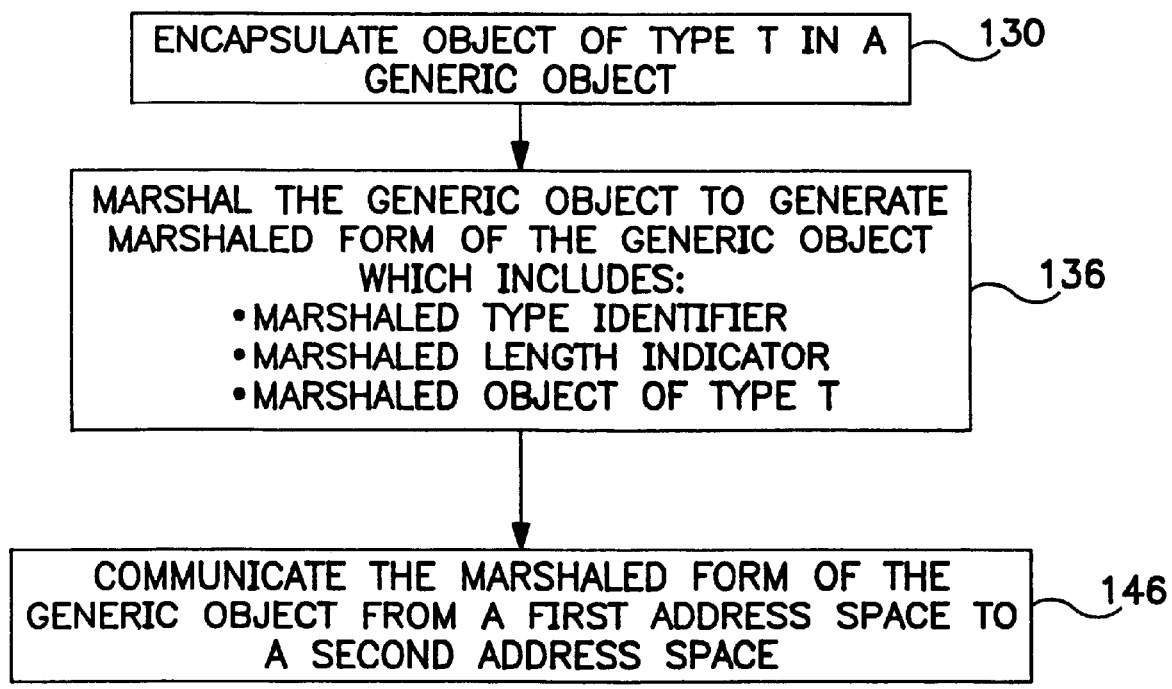
FIGS. 8, 9 and 10 are flowcharts illustrating the method steps of one embodiment of the present invention.
Figure 9:
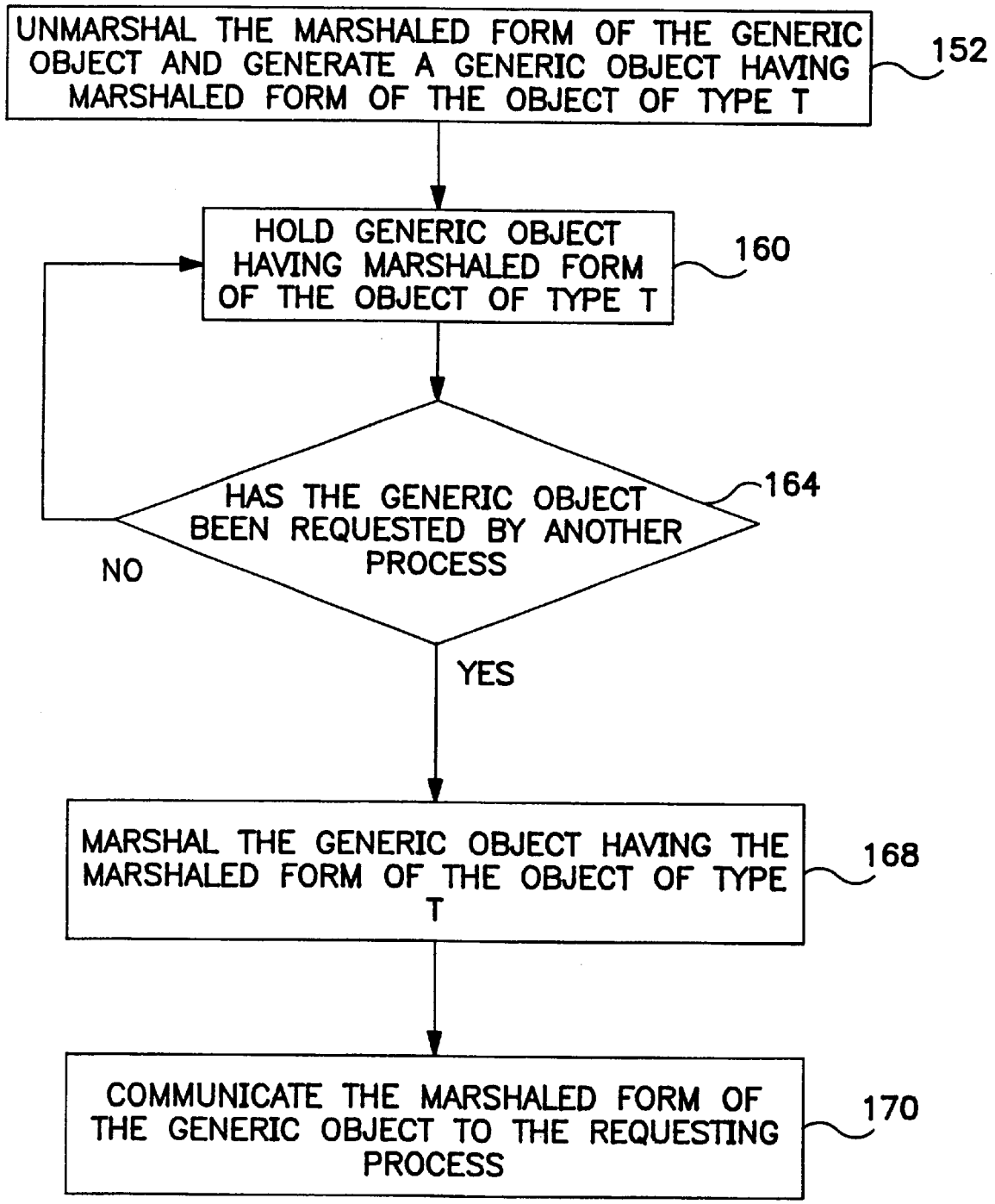
Figure 10:
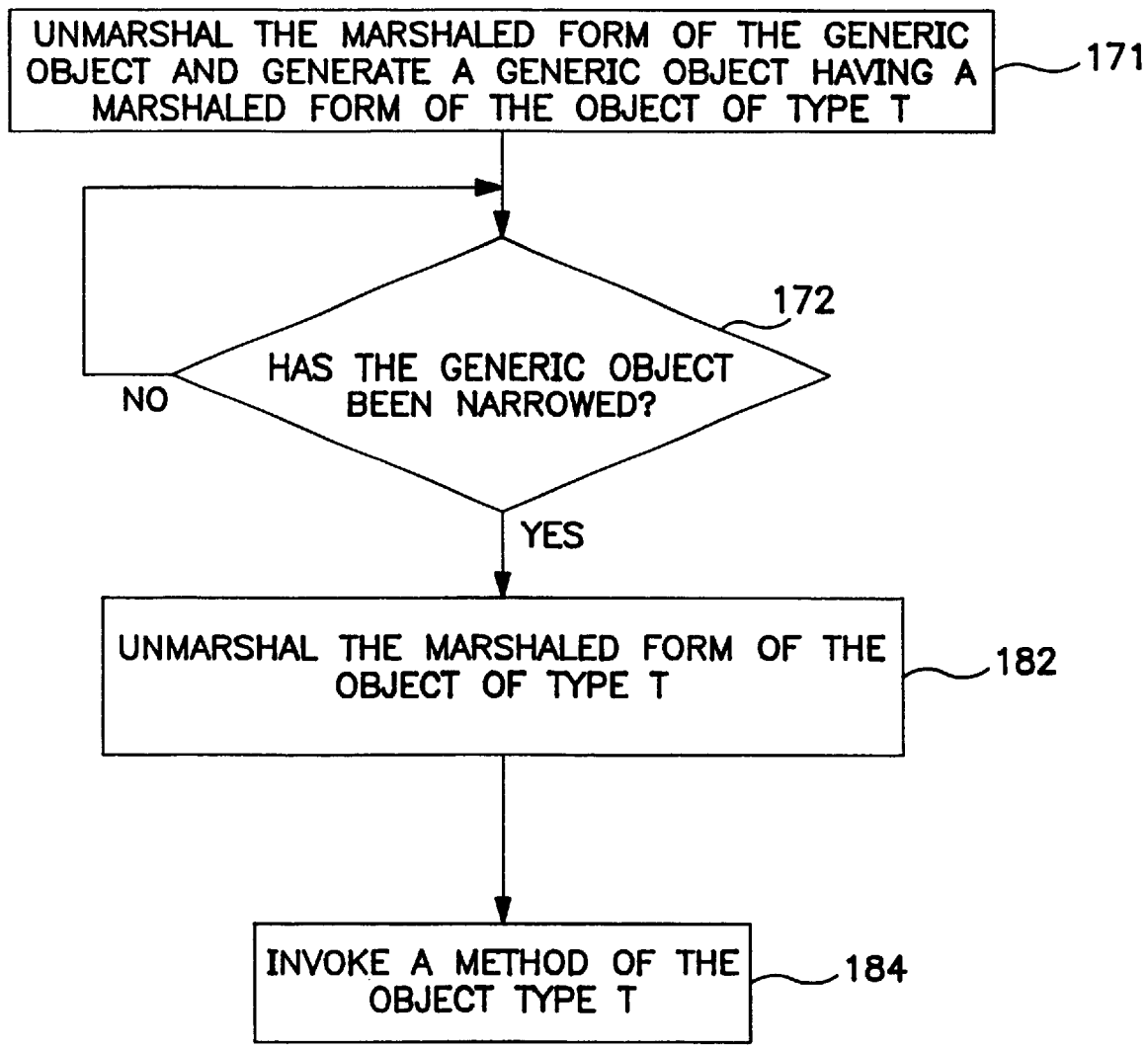

FIGS. 8, 9 and 10 are flowcharts illustrating the method steps of the present invention.

FIG. 8 illustrates the method steps of a first process (e.g., a client) in a first address space. In method step 130, an object of a type T is encapsulated in a generic object. The encapsulation, also known as widening or conversion, changes the view of that object so that the object of type T is no longer viewed as an object of type T but as a generic object. In processing step 136, a stub marshals the generic object and generates a marshaled form of the generic object. The marshaled form of the generic object includes the marshaled form of the type identifier, a marshaled form of the length indicator and the marshaled form of the object of type T. In step 146, the marshaled form of the generic object is communicated from the first process in the first address space to a second process (e.g., generic service) in a second address space via marshal buffers.

FIG. 9 illustrates the method steps of a second process (e.g., generic or intermediate service) in a second address space. In processing step 152, the marshaled form of the generic object is unmarshaled to generate a generic object having a marshaled form of the object of type T. For example, the unmarshaled generic object may simply copy the marshaled form of the object of type T from the marshal buffer 114 of FIG. 7.

In processing step 160, the second process in the second address space holds the generic object having a marshaled form of the object of type T.

In decision block 164, a determination is made whether another process has requested the use of the generic object. If yes, the generic object having the marshaled form of the object of type T is marshaled (processing step 168). In processing step 170, the marshaled form of the generic object is communicated to the requesting process (e.g., another client) in a third address space. For example, the marshaled generic object may be copied into the transmit marshal buffer 118, as shown in FIG. 7, and communicated to a third process (e.g., another client).

If the determination in decision block 164 is no, processing continues at processing step 160. In other words, the second process holds the generic object having a marshaled form of the object of type T until this generic object is requested by another process.

FIG. 10 illustrates the method steps of a third process (e.g., another client) in a third address space.

In processing step 171, the marshaled form of the generic object is unmarshaled to generate a generic object having a marshaled form of the object of type T. In decision block 172, a determination is made whether or not the generic object has been narrowed. If yes, the marshaled form of the object of type T is unmarshaled (processing step 182). In processing step 184, a method of the object of type T is invoked.

If the determination in decision block 172 is no, processing continues to loop in decision block 172 until the generic object is narrowed.

When a stub narrows the generic object into an object having the specific type T (i.e., narrowing operation), the marshaled form of object T is implicitly unmarshaled. Since a method associated with the object of type T is being invoked, the code for the object of type T is available. Accordingly, the marshal and unmarshal code of the specific type of object T is also available.

In one embodiment the present invention is implemented in a name service. The name service holds the association between a name and a variable (e.g., object). A client makes this association by invoking the name service via a bind or other similar operation. Another client invokes the name service to perform a name lookup and to obtain the variable associated with that name. The name service holds the variable and passes it on clients who perform a lookup, but the name service does not invoke the methods of the variable. The present invention allows the name service to be able to deal with variables of all kinds (note that all variables types can be converted to the generic type), including generic types such as Any, Object or Named. Moreover, the present invention allows the name service to receive, hold, and pass on generic objects having the marshaled form of the object of type T without having the marshal and unmarshal code associated with the object of type T.

In an alternative embodiment, the present invention may be implemented in a subscription service. A subscription service holds an association between a list of subscribers and various types of information. Moreover, a subscription service is accessible to publishers of different types of information. A client who wishes to publish information via the subscription service may invoke the subscription service via a publish operation and pass information to be published to the service. Clients who are subscribers of that particular information receive that information when it is published. The present invention implemented in the subscription service allows this subscription service to receive, hold and pass the generic object with a marshaled form of the object of type T so that the publication service does not require the marshal and unmarshal code for object of all types.

Figure 11:
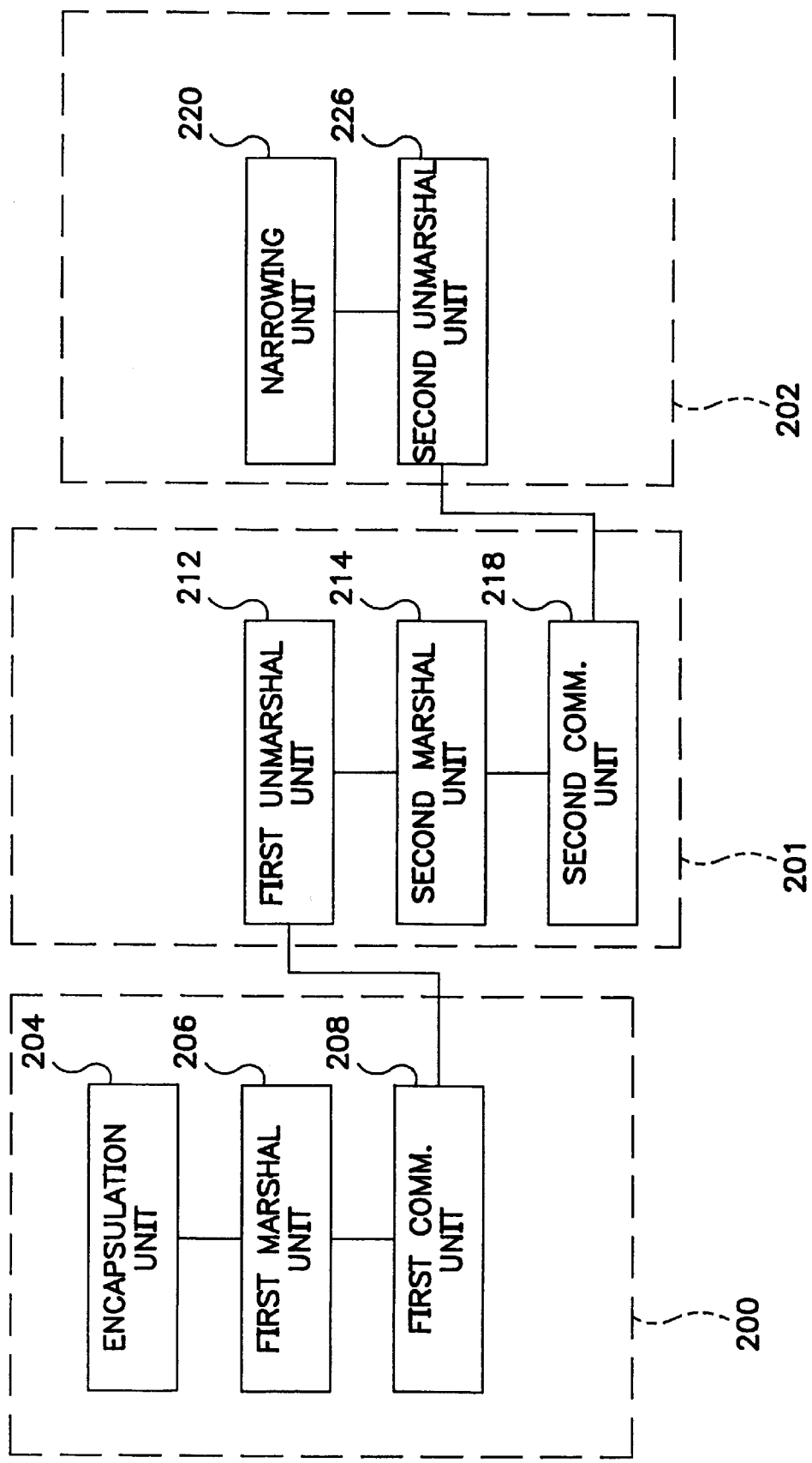
FIG. 11 is a block diagram illustrating an embodiment of the apparatus of the present invention.

FIG. 11 is a block diagram illustrating an embodiment of the apparatus of the present invention. The present invention includes an encapsulation unit 204 configured to encapsulate an object of type T in a generic object. A first marshal unit 206, which is configured to marshal the generic object in a first address space 200 and generate a marshaled form of the generic object is coupled to the encapsulation unit 204. The first marshal unit 206 marshals a type identifier of the generic object and also a length indicator. As noted previously, the type identifier of a generic object is simply an interface to the generic object that specifies a collection of methods which that generic object understands. For example, a type identifier may simply be the class to which the generic object belongs. The length indicator is simply a value that represents the length of the marshaled form of the object of type T. This length indicator may also be a pointer to such a value. The first marshal unit 206 also marshals the object of type T to generate the marshaled form of the object of type T.

A first communication unit 208 is coupled to the first marshal unit 206. The first communication unit 208 is configured to communicate the marshaled form of the generic object, which includes the marshaled form of the type identifier, the marshaled form of the length indicator, and the marshaled form of the object of type T from the first address space to a second address space 201. For example, the first communication unit 208 may simply copy the marshaled form of the generic object and provide it to the second address space 201. In alternative implementations, the first communication unit 208 may need to perform a transformation on the marshaled form of the generic object so that it is compatible with the second address space 201.

A first marshal unit 212, which is coupled to the first communication unit 208, is configured to unmarshal the marshaled form of the generic object in the second address space to generate a generic object that has a marshaled form of the object of type T.

A second marshal unit 214, which is coupled to the first marshal unit 212, is configured to marshal the generic object having the marshaled form of the object of type T to generate a marshaled form of the generic object. When the second marshal unit 214 marshals the generic object that includes the marshaled form of the object of type T, the second marshal unit 214 marshals the type identifier and the length indicator. Moreover, the second marshal unit 214 marshals the marshaled form of the object of type T. For example, the second marshal unit 214 may simply copy the marshaled form of the object of type T into a transmit buffer (not shown), which is subsequently provided to the third address space 202 via the second communication unit 218.

A second communication unit 218 is coupled to the second marshal unit 214. The second communication unit 218 is configured to communicate the marshaled form of the generic object to a third address space 202.

The second unmarshal unit 226 is coupled to the second communication unit 218 and is configured to unmarshal the marshaled form of the generic object passed from the second address space 201. The second unmarshal unit 226, as the first unmarshal unit 212, unmarshals the type identifier and the length indicator, but simply copies the marshaled form of the object of type T from the marshal buffer.

A narrowing unit 220 is coupled to the second unmarshal unit 226. The narrowing unit 220 is configured to narrow the generic object having the marshaled form of type T into an object of type T. During the narrowing process, the marshaled form of the object of type T is unmarshaled implicitly.

It should be noted that the functional units illustrated in FIG. 11, may be implemented in hard-wired circuitry, by programming a general purpose processor, or by any combination of hardware and software. Moreover, the phrase "coupled to" is intended to mean that a value generated during the execution of one sequence of instructions by a first functional unit is used during the execution of a second sequence of instructions by a second functional unit. Furthermore, although FIG. 11 illustrates the functional units in three respective address spaces, the functional units themselves may physically be located in one machine or distributed across a network. As noted previously, any of these functional units may be implemented by a programmed processor or by hard-wired logic circuit, or any combination thereof.

Figure 12:
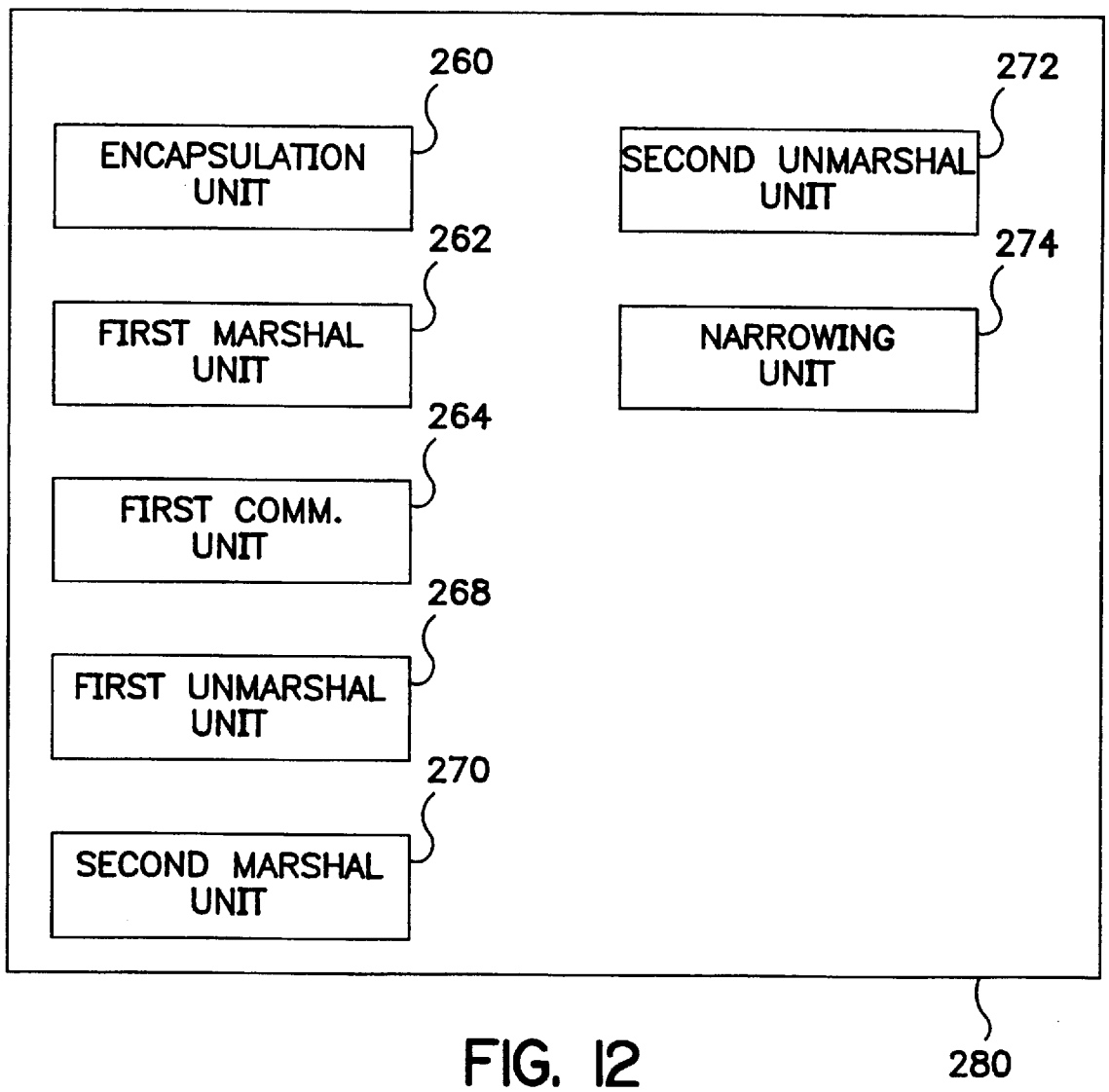
FIG. 12 illustrates an alternative embodiment of the present invention.

FIG. 12 illustrates an alternative embodiment of the present invention. FIG. 12 illustrates an encapsulation unit 260, a first marshal unit 262, a first communication unit 264, a first unmarshal unit 268, a second marshal unit 270, a second unmarshal unit 272, and a narrowing unit 274 all configured to perform the functions as described previously. Each of these units represent a sequence of program instructions or code that is disposed or stored in a memory 280. For example, memory 280 may be a memory section 64, as illustrated in FIG. 5. Memory 280 may also be disposed in the disk storage unit 69 or the CD-rom medium 68, as shown in FIG. 5. Furthermore, although the functional units 260–274 are shown as disposed in one memory 280, it will be understood by one skilled in the art that these sequence of instructions or code may be local to one machine or distributed across many machines in a computer system or network.

A method and apparatus for passing generic objects in a distributed system has been disclosed. In sophisticated operating systems such Spring, where the client side representation of data for server-based objects is not fixed, the present invention provides an elegant solution for generic services that simply hold and pass along generic objects.

Since each object in these flexible operating systems can choose a different kind of representation, and new representations are constantly being generated, the stubs in such systems do not have the necessary code to marshal the client side representation of the data. In Spring, the mechanism of subcontract is employed to marshal and unmarshal the various different formats of the client side representation of remote objects.

The present invention allows a generic service or intermediate service to hold and pass a generic object having a marshaled form of the object of type T without having the marshal and unmarshal code for the object of type T.

In the foregoing specification, the invention has been described with reference to specific exemplary embodiments thereof. It will however be evident that various modifications and changes may be made thereto without departing from the broader spirit and scope of the invention as set forth in the appended claims. The specification and drawings are accordingly to be regarded as illustrative rather than restrictive.

What is claimed is:

1. A method for communicating a first generic object, said first generic object including an object of a type T, said method comprising:
   a) in a first address space, marshaling the first generic object to generate a marshaled form of the first generic object comprising a marshaled form of the object of type T;
   b) communicating the marshaled form of the first generic object from the first address space to a second address space; and
   c) in the second address space, unmarshaling the marshaled form of the first generic object to generate a second generic object comprising the marshaled form of the object of type T, without unmarshaling the object of type T, where unmarshaling of the marshaled form of the first generic object further comprises copying the marshaled form of the object of type T from the marshaled form of the first generic object into the second generic object.

2. The method of claim 1 further comprising:
   a) in the second address space, marshaling the second generic object comprising the marshaled form of the object of type T, without marshaling the object of type T, where marshaling of the second generic object further comprises copying the marshaled form of the object of type T from the second generic object into a marshal buffer to create a marshaled form of the second generic object; and
   b) communicating the marshaled form of the generic object to a third address space.

3. The method of claim 2 further comprising:
   a) in the third address space, unmarshaling the marshaled form of the second generic object to generate a third generic object comprising the marshaled form of the object of type T, without unmarshaling the object of type T, where unmarshaling of the marshaled form of the second generic object further comprises copying the marshaled form of the object of type T from the marshaled form of the second generic object into the third generic object; and
   b) in the third address space, narrowing the third generic object to generate the object of type T, where narrowing further comprises unmarshaling the marshaled form of object T.

4. The method of claim 1 wherein the step of marshaling the first generic object to generate the marshaled form of the first generic object further includes the steps of:
   a) marshaling a type identifier to generate a marshaled form of the type identifier, said type identifier indicative of the type T; and
   b) marshaling the object of type T to generate the marshaled form of the object of type T.

5. The method of claim 4 wherein the step of marshaling the first generic object to generate the marshaled form of the first generic object further comprises the step of:
   marshaling a length indicator to generate a marshaled form of the length indicator, said length indicator indicative of the length of the marshaled form the object of type T.

6. The method of claim 4 further comprises the step of: unmarshaling the marshaled form of the type identifier.

7. The method of claim 5 further comprises the step of: unmarshaling the marshaled form of the length indicator.

8. The method of claim 1 wherein the second address space includes a generic service.

9. The method of claim 8 wherein the generic service is a name service.

10. A computer system configured to communicate a first generic object, said first generic object including an object of a type T, said computer system comprising:
    a) a first marshal unit configured to marshal the first generic object in a first address space to generate a marshaled form of the first generic object comprising a marshaled form of the object of type T;
    b) a first communication unit coupled to the first marshal unit, said first communication unit configured to communicate the marshaled form of the first generic object from the first address space to a second address space;
    c) a first unmarshal unit coupled to the first communication unit, said first unmarshal unit configured to unmarshal the marshaled form of the first generic object in the second address space to generate a second generic object comprising the marshaled form of the object of type T, without unmarshaling the object of type T; and
    d) a first copy unit coupled to the first unmarshal unit, said first copy unit configured to copy the marshaled form of the object of type T from the marshaled form of the first generic object into the second generic object.

11. The computer system of claim 10 further comprising:
    a) a second marshal unit coupled to the first unmarshal unit, said second marshal unit configured to marshal the second generic object comprising the marshaled form of the object of type T in the second address space without marshaling the object of type T;
    b) a second copy unit coupled to the second marshal unit, said second copy unit configured to copy the marshaled form of the object of type T from the second generic object into a marshal buffer to create a marshaled form of the second generic object; and
    c) a second communication unit coupled to the second marshal unit, said second communication unit configured to communicate the marshaled form of the second generic object to a third address space.

12. The computer system of claim 11 further comprising:
    a) a second unmarshal unit coupled to the second communication unit, said second unmarshal unit configured to unmarshal the marshaled form of the second generic object in the third address space to generate a third generic object comprising the marshaled form of the object of type T, without unmarshaling the object of type T; and
    b) a third copy unit coupled to the second unmarshal unit, said third copy unit configured to copy the marshaled form of the object of type T from the marshaled form of the second generic object into the third generic object.
    c) a narrowing unit coupled to the second unmarshal unit, said narrowing unit configured to narrow the third generic object comprising the marshaled form of the object of type T; and
    d) a third unmarshal unit coupled to the narrowing unit, said third unmarshal unit configured to unmarshal the marshaled form of object T to generate the object of type T.

13. The computer system of claim 10 wherein the second address space includes a generic service.

14. The computer system of claim 13 wherein the generic service is a name service.

15. A computer software product that includes a medium readable by a processor, the medium having stored thereon:
   a) a first sequence of instructions which, when executed by said processor in a first address space, causes said processor to unmarshal a marshaled form of a first generic object comprising a marshaled form of an object of type T, without unmarshaling the object of type T, to generate a second generic object comprising the marshaled form of the object of type T, where said first sequence of instructions to cause said processor to unmarshal the marshaled form of the first generic object further comprises instructions to cause said processor to copy the marshaled form of the object of type T from the marshaled form of the first generic object into the second generic object.

16. The computer software product of claim 15 further comprising:
   a) a second sequence of instructions which, when executed by said processor in the first address space, causes said processor to marshal the second generic object comprising the marshaled form of the object of type T, without marshaling the object of type T, where said second sequence of instructions to cause said processor to marshal the second generic object further comprises instructions to cause said processor to copy the marshaled form of the object of type T from the second generic object into a marshal buffer to create a marshaled form of the second generic object; and
   b) a third sequence of instructions which, when executed by said processor, causes said processor to communicate the marshaled form of the second generic object from the first address space to a second address space.

17. The computer software product of claim 16 further comprising:
   a) a fourth sequence of instructions which, when executed by said processor, causes said processor to marshal a type identifier to generate a marshaled form of the type identifier in the first address space, said type identifier indicative of the type T; and
   b) a fifth sequence of instructions which, when executed by said processor, causes said processor to marshal the object of type T to generate a marshaled form the object of type T in the first address space.

18. The computer software product of claim 17 further comprising:
   a sixth sequence of instructions which, when executed by said processor, causes said processor to marshal a length indicator to generate a marshaled form of the length indicator in the first address space, said length indicator indicative of the length of the marshaled form the object of type T.

19. A computer software product that includes a medium readable by a processor, the medium having stored thereon:
   a) a first sequence of instructions which, when executed by said processor, causes said processor to unmarshal a marshaled form of a first generic object comprising a marshaled form of an object of type T, without unmarshaling the object of type T, and to generate a second generic object comprising the marshaled form of the object of type T, where said first sequence of instructions to cause said processor to unmarshal the marshaled form of the first generic object further comprises instructions to cause said processor to copy the marshaled form of the object of type T from the marshaled form of the first generic object into the second generic object; and
   b) a second sequence of instructions which, when executed by said processor, causes said processor to narrow the second generic object to generate the object of type T, where said second sequence of instructions to cause said processor to narrow the second generic object further comprises instructions to cause said processor to unmarshal the marshaled form of the object of type T.

20. The computer software product of claim 19 further comprising:
   a third sequence of instructions which, when executed by said processor, causes said processor to unmarshal the marshaled form of a type identifier.

21. The computer software product of claim 20 wherein the step of unmarshaling the marshaled form of the first generic object further comprises the step of:
   a fourth sequence of instructions which, when executed by said processor, causes said processor to unmarshal the marshaled form of a length indicator.

* * * * *